(12) United States Patent
Tse et al.

(10) Patent No.: US 8,295,292 B2
(45) Date of Patent: Oct. 23, 2012

(54) HIGH PERFORMANCE HARDWARE LINKED LIST PROCESSORS

(75) Inventors: Alfred Yiu-Chun Tse, San Jose, CA (US); Edmund G. Chen, Sunnyvale, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 339 days.

(21) Appl. No.: 12/783,419

(22) Filed: May 19, 2010

(65) Prior Publication Data

US 2011/0286463 A1  Nov. 24, 2011

(51) Int. Cl.
*H04L 12/28* (2006.01)
(52) U.S. Cl. .................. 370/400; 710/316; 379/242
(58) Field of Classification Search .................. 370/400, 370/429, 392, 431; 345/522; 712/229
See application file for complete search history.

(56) References Cited

U.S. PATENT DOCUMENTS

| | | | |
|---|---|---|---|
| 7,349,398 B1 | 3/2008 | Favor et al. | |
| 7,349,399 B1 | 3/2008 | Chen et al. | |
| 7,808,999 B2 | 10/2010 | Chen et al. | |
| 7,852,846 B2 | 12/2010 | Favor et al. | |

*Primary Examiner* — Robert Wilson
*Assistant Examiner* — Lionel Preval
(74) *Attorney, Agent, or Firm* — Blakely Sokoloff Taylor & Zafman, LLP

(57) ABSTRACT

In one embodiment, a reassign command is received for reassigning a first node identified by a first global identifier (GID) from a first context identified by a first context ID (CID) to a second context identified by a second CID, the first and second contexts representing first and second linked lists, respectively. A walk-the-chain (WTC) command having the first GID and the first CID is issued to a first linked list processor. The first linked list processor is configured to access one or more nodes of the first context in an attempt to dequeue the first node from the first context. An enqueue command having the first GID and the second CID is issued to a second linked list processor. The second linked list processor is configured to insert the first node to the second context. The first and second linked list processors are cascaded to form a pipeline.

21 Claims, 11 Drawing Sheets

500

Receive a reassign command for reassigning a first of the nodes that is identified by a first of the GIDs from a first of the linked lists identified by a first of the CIDs to a second of the linked lists identified by a second of the CIDs, the first and second linked lists representing a first and a second of the contexts, respectively.
501

Issue a walk-the-chain (WTC) command specifying the first GID and the first CID to a first linked list processor, wherein the first linked list processor is adapted to dequeue the first node from the first linked list.
502

Issue an enqueue command specifying the first GID and the second CID to a second linked list processor, where the second linked list processor is adapted to insert the first node into the second linked list, and the first and second linked list processors are cascaded to form a pipeline, where the linked list processors are adapted to access a set of one or more tables that are shared by the linked list processors and that store data identifying the sequence of the nodes in each of the linked lists and a status of each of the nodes.
503

FIG. 5

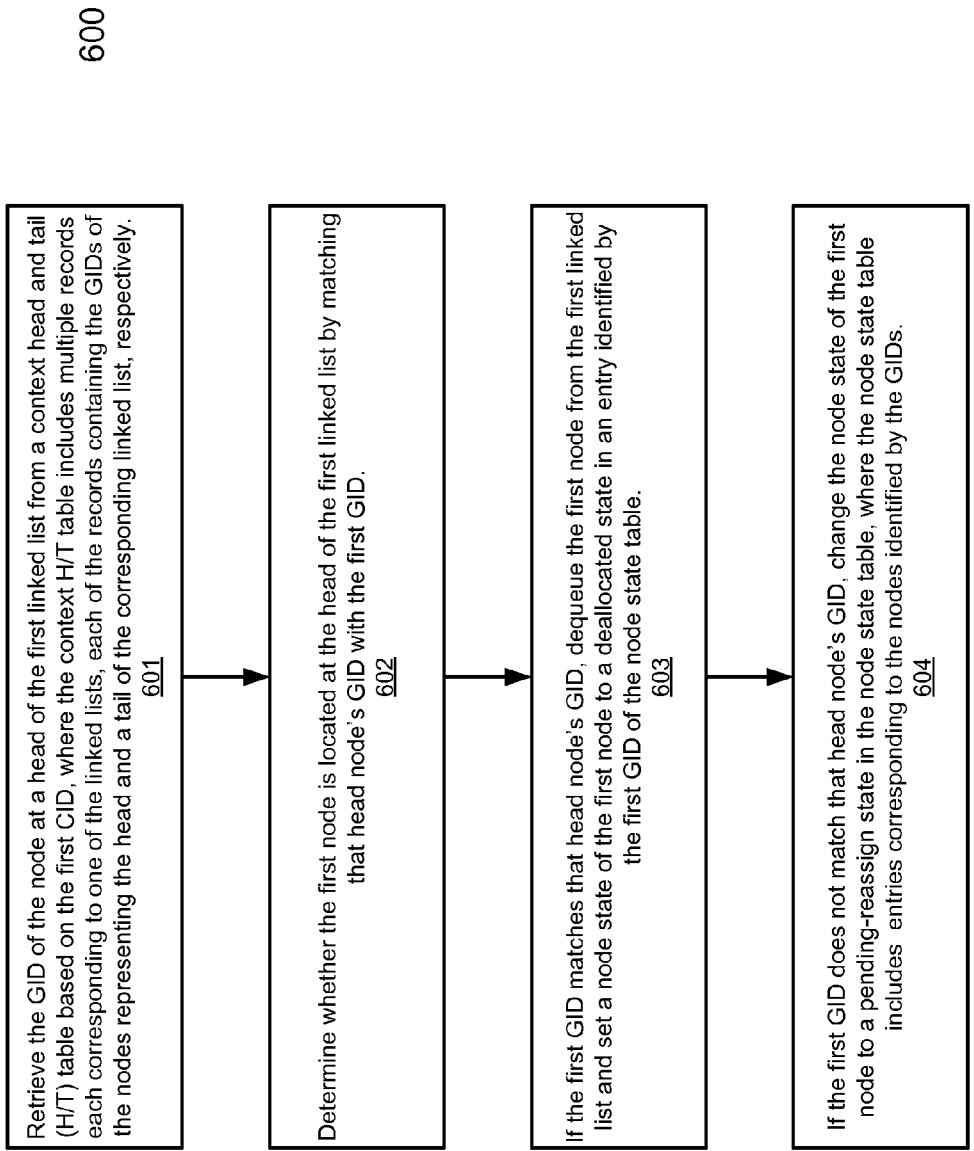

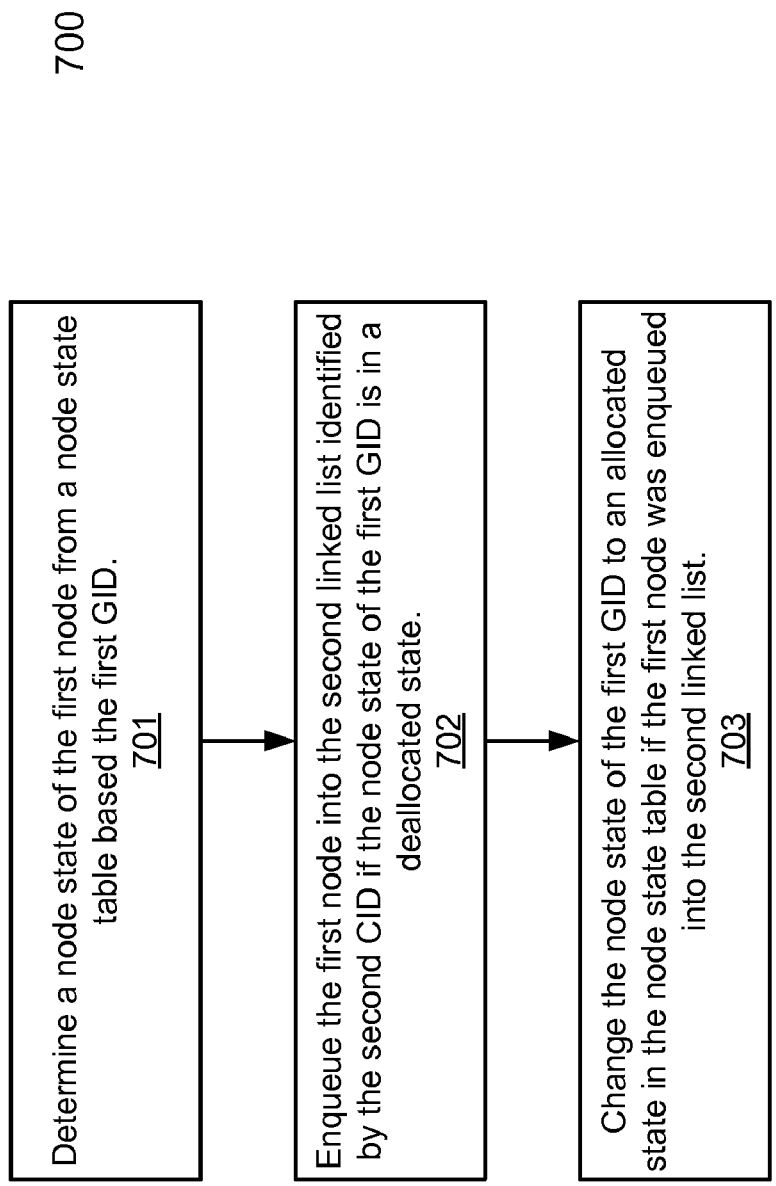

HIGH PERFORMANCE HARDWARE LINKED LIST PROCESSORS

FIELD OF THE INVENTION

Embodiments of the invention relate generally to the field of data processing systems; and more particularly, to linked list processors.

BACKGROUND

Parallel processing is a fundamental technique to improve the performance in hardware. But once a sequence of jobs is separated for parallel processing, the original ordering of the sequence may be lost. If the ordering is important, software/hardware will synchronize with the other jobs before it is released to the next processing stage.

In a network processor, when sequences of packets are sent out to multiple processors for parallel processing, the processing time for each packet can vary based upon the packet types. To reduce the processor idling time waiting for other packets to synchronize within a sequence, a reordering hardware block is employed to maintain the packet ordering, and to provide a synchronization point in the system. Once the processor has processed a packet, it flushes an identifier to the reordering block. The reordering block may hold the packet identifier until older packets have been processed, and reestablish the original ordering.

The general implementations of the reordering block are usually performed by a hardware linked list. Before packets enter the multi-processor domain, a linked list is established for different packet sequences, also referred to as a context. Typical linked list operations include: 1) enqueue operation—allocation of a node; 2) dequeue operation—deallocation of a node; 3) walk the chain (WTC) operation—seeking for a next node of a linked list; and 4) flush operation—indicating that operations of a node are completed and it can be dequeued.

In many cases, simple packet ordering is necessary, but not sufficient, as critical code segments within multiple packets need to be executed serially in order to perform the necessary function. In this case, it requires a mechanism not only to maintain packet ordering, but also to: 1) partition the input packet stream into substreams, subsequent packet ordering only needs to be maintained within a substream; and 2) serialize critical code segments within a substream without hindering parallelism in non critical code segments.

To address these two requirements, the concept of "reassign" is required. This function has to run at packet rate and to be performed multiple times per packet. During the packet processing, a program can decide to reassign a packet from the original context to a new one. This function is referred to as "reassign." A reassign command can further be broken down into a dequeue operation from the original context and an enqueue operation to a new context.

There are several techniques to implement the reordering block that can manage a typical linked list operation and perform a reassign function. The first technique is to use registers to implement the linked list structures, which allow multiple linked list processing operations to be performed in parallel. In additional, each linked list may need separate state control logic. The second technique is to use single port memory to implement the linked list structures. Single port memory can only read one data per cycle and the processing pipeline can only perform a single operation per cycle at best.

The register technique provides a high performance solution. But as the number of contexts and nodes increases, it becomes cost ineffective and it is not scalable. The single port memory technique does not provide a performance beyond one operation per cycle, assuming it is fully pipelined. In order to support reassign commands, the pipeline would need to stall to absorb the above two commands: reassign enqueue and WTC command for the original context. If every element requires supporting reassign once, the performance will be reduced in half. Therefore, using a single port memory technique is unable to support multiple or one "reassign" per packet.

SUMMARY OF THE DESCRIPTION

System and method for processing data of multiple linked lists are described herein. According to one aspect, a reassign command is received for reassigning a first of the nodes that is identified by a first of the global identifiers (GIDs) from a first of the linked lists identified by a first of the context identifiers (CIDs) to a second of the linked lists identified by a second of the CIDs. The first and second linked lists represent a first and a second of the contexts, respectively. A walk the chain (WTC) command specifying the first GID and the first CID is issued to a first linked list processor, where the first linked list processor is configured to dequeue the first node from the first linked list. An enqueue command specifying the first GID and the second CID is issued to a second linked list processor, where the second linked list processor is configured to insert the first node into the second linked list. The first and second linked list processors are cascaded to form a pipeline. The linked list processors are configured to access a set of one or more tables that are shared by the linked list processors and that store data identifying the sequence of the nodes in each of the linked lists and a status of each of the nodes. As a result, separating the first node's reassignment into the two commands executed in a pipelined manner by two linked list processors cascaded to form a pipeline reduces reassignment based pipeline stalls.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

FIG. 5 is a flow diagram illustrating a method for processing a reassign command of a linked list according to one embodiment of the invention.

FIG. 6 is a flow diagram illustrating a method for processing a walk-the-chain command according to one embodiment of the invention.

FIG. 7 is a flow diagram illustrating a method for enqueuing a node into a context according to one embodiment of the invention.

DETAILED DESCRIPTION

Figure 1:
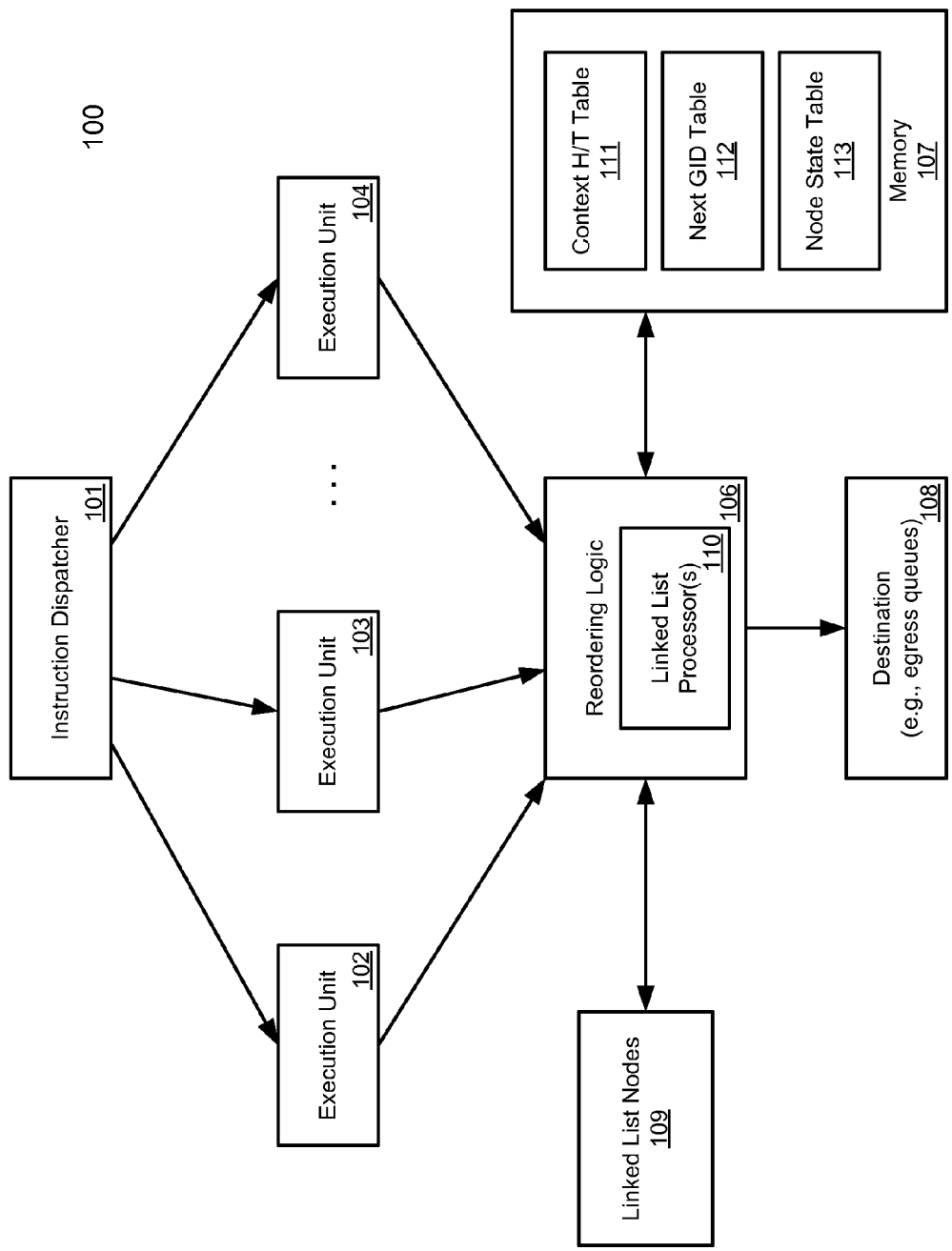
FIG. 1 is a block diagram illustrating an example of a processor according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to some embodiments of the invention, a dual port memory (e.g., one read port and one write port) is utilized in each linked list processor and multiple linked list processors can be coupled to achieve different performances as needed. Each linked list processor may be pipelined. When executing a reassign command or instruction, a first linked list processor is configured to operate a reassign dequeue command and generate a WTC command for the original context. A second linked list processor (e.g., the next processor in the pipeline) is configured to operate a reassign enqueue command. This may prevent the pipeline to stall and improve the maximum performance to N commands per cycle, where N corresponding to the number of linked list processors.

According to one embodiment, a node state approach is utilized to manage each node in the linked lists. All the node states are stored in a memory embodied in a non-transitory computer readable medium. Each new instruction processed by a linked list processor reads the corresponding node state. Depending upon the node state and the type of the instruction, the linked list processor may execute or defer executing the instruction accordingly and update the node state as needed. As described herein, instructions may refer to specific configurations of hardware such as application specific integrated circuits (ASICs) configured to perform certain operations or having a predetermined functionality or software instructions stored in memory embodied in a non-transitory computer readable medium.

Some instructions may generate one or more other instructions that may be issued back to the same linked list processor. For example: a WTC instruction can generate another WTC instruction. A reassign instruction can generate another reassign enqueue and WTC instructions. When one instruction generates multiple instructions, it may require infinite command storage for the self-generated commands or otherwise pipeline may be stalled for one cycle. To solve this problem, according to one embodiment, a retry command block or logic is utilized. Due to the fact that all pending linked list commands can be reduced down to a WTC command, a WTC command only needs to store one bit to represent a context number in a vector. The retry logic scans the retry context number vector and generates a new instruction into the pipeline when pipeline is free to take a new command.

In one embodiment, using the multiple linked list processor approach, as the number of reassignment performance requirement increases, more linked list processors can be coupled (e.g., cascaded) to meet the requirement. This solution provides a flexibility to increase the performance without redesigning the hardware. Using the node state techniques can reduce the complexity of the design and allow hardware self checking when software (e.g., a process executed by one of the execution units, processors, or processor cores) sends out an incorrect command. For example, if a node is in a deallocated state and software sends a flush command to that node, hardware can detect that there may be a software error. If a node is in a pending-flush state and it receives a WTC command, it could be an error. In additional to the error checking, software can access the node state to manipulate the linked list.

The retry command logic provides a solution to keep the pipeline flowing without being stalled by the self-generate commands. This allows instructions being deferred without stopping operations of the nodes. In addition, it solves the head of line blocking issue. For example, assuming all dequeue operations are sent out from the same bus, it is possible that an earlier dequeue operation blocks a subsequent dequeue operation because the destination is not ready. The retry command logic enables the linked list processing pipeline to defer the node operations until the destination is ready.

FIG. 1 is a block diagram illustrating an example of a processor according to one embodiment of the invention. For example, processor 100 may be implemented as a part of a network or packet processor of a network element. Referring to FIG. 1, processor 100 includes, but not limited to, one or more execution units 102-104 coupled to instruction fetch/dispatch unit 101, which fetches instructions from an instruction cache and/or memory and dispatches to execution units 102-104 for executions. Execution units 102-104 may be physical processors (e.g., central processing units or CPUs), processor cores, and/or other functional units. Throughout this application, for the purpose of illustration, processors, processor cores, and execution units are interchangeable terms.

In addition, processor 100 includes data or packet reordering logic 106 having one or more linked list processors or processing logic 110 therein for processing data associated one or more linked lists 109 stored in memory 105 shared and accessible by linked list processors 110. For example, a stream of packets received from a source and instructions for processing the packets are dispatched to execution units 102-104 for executions in parallel as part of multi-threaded processing. Typically, the packets are labeled in sequence during the executions. The packets may be processed in an out-of-order manner dependent upon the availability of execution units 102-104 and/or types of the packets. After the executions and prior to transmitting the packets to the next stage, destination 108, the processed packets have to be put back into the original sequence. The job of reordering logic 106 is to dispatch the result of the executions to destination 108 in a proper order (e.g., the same or similar order as the packets came in). The data or results of the executions are stored in one or more linked lists, each linked list may represent a sequence of packets.

A linked list is a data structure that consists of a sequence of data records (also referred to as nodes or data elements)

such that each record is associated with a field that contains a reference (i.e., a link) to the next record in the sequence. Linked lists are among the simplest and most common data structures, and are used to implement many important abstract data structures, such as stacks, queues, hash tables, symbolic expressions, skip lists, and many more. The principal benefit of a linked list over a conventional array is that the order of the items in the linked list may be different from the order that the data items are stored in memory or on disk. For that reason, linked lists allow insertion and removal of nodes at any point in the list, with a constant number of operations.

Embodiments of the invention utilize hardware, such as memory 107 (also referred to as a node state RAM), to implement the linked lists and the associated manipulations. In one embodiment, each linked list represents a reorder context identified by a context identifier (CID), where each context is used to group packets and determine the order for processing the packets within each group. Each node represents a data element of a linked list and is identified by a unique global identifier (GID) that identifies the node at the point in time or given session(s). In one embodiment, processor 100 includes memory 107 having a set of one or more tables that are shared among the linked list processors, including context head and tail (H/T) table 111, next GID table 112, and a node state table 113 stored therein. Linked list processors 110 are configured to utilize context H/T table 111, next GID table 112, and node state table 113 to manipulate the linked lists, including insertion (e.g., enqueue) and deletion (e.g., dequeue) of a node, etc.

Figure 2:
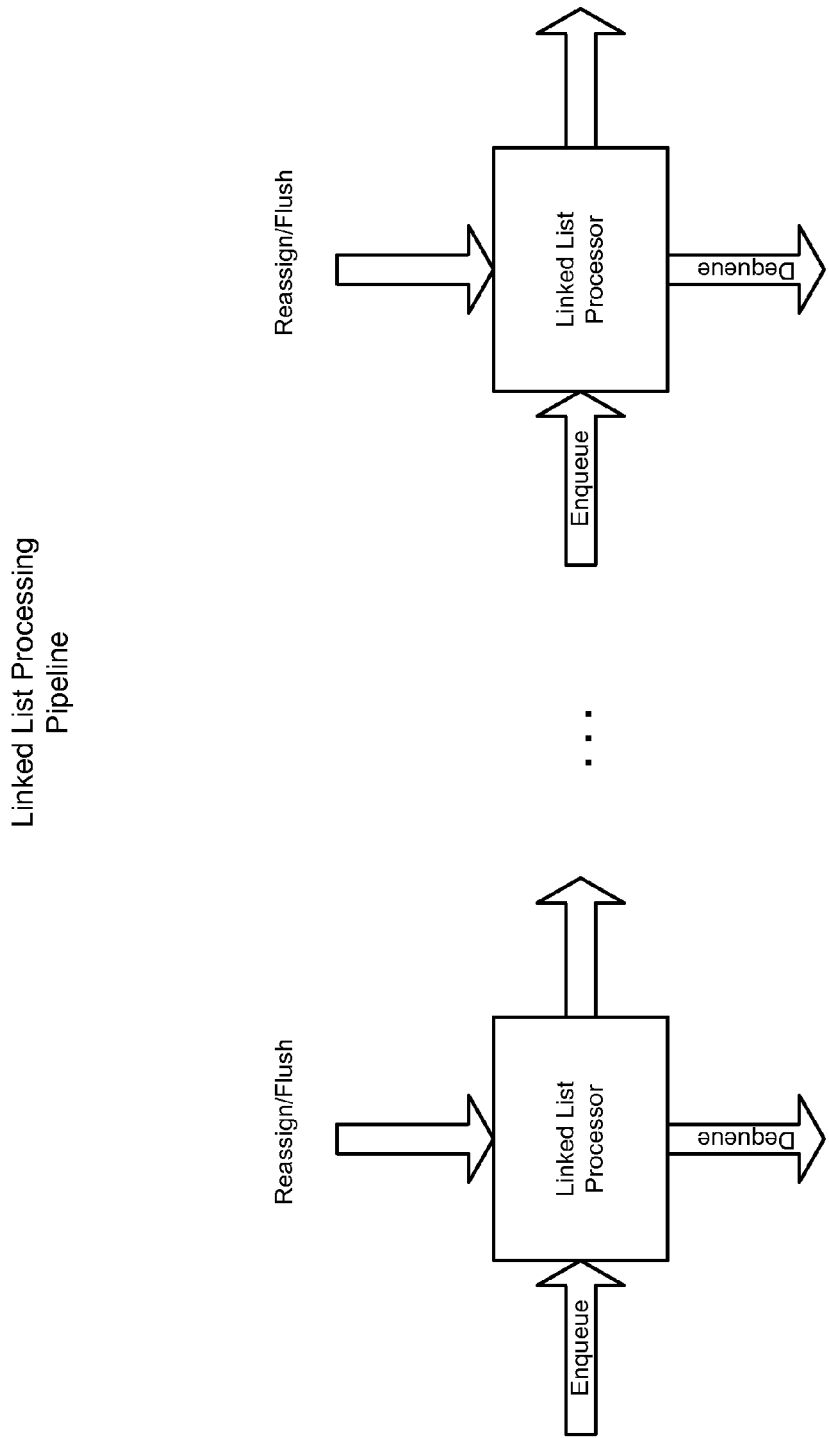
FIG. 2 is a block diagram illustrating a linked list processing pipeline according to one embodiment of the invention.

In one embodiment, multiple linked list processors can be utilized to process the same linked list or different linked lists independently, in parallel or in a pipeline manner, as shown in FIG. 2. For example, a first linked list processor can process a first linked list while a second linked list processor is processing a second linked list. Alternatively, a first linked list processor can process a first command on a particular node with respect to a first linked list, while a second linked processor processes a second command on the same node with respect to a second linked list, which may depend upon a result of the first command processed by the first linked list processor.

For example, during a reassign operation of a node from a first linked list to a second linked list, the first linked processor may process a dequeue operation of the node from the first linked list and the second linked list processor may process an enqueue operation of the node into the second linked list. However, the second linked processor may have to wait until the node is completely dequeued (e.g., removed or popped) from the first linked list by the first linked list processor, before enqueuing (e.g., inserting or pushing) the node into the second linked list. In this embodiment, the first and second linked processors may utilize node state table 113 to store and determine the state of a node at a particular moment in time to determine a particular operation to be performed.

Figure 3:
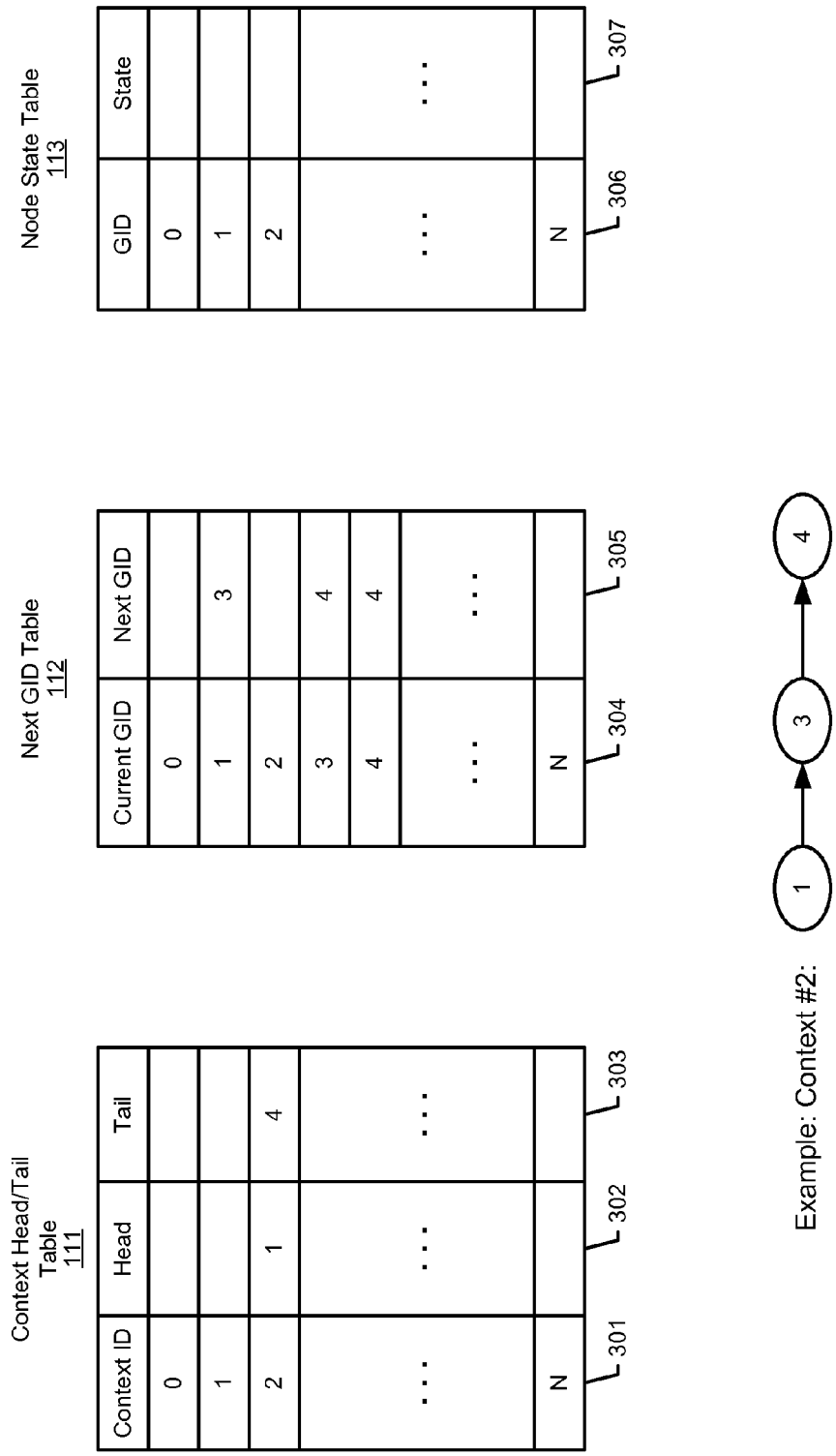
FIG. 3 is a block diagram illustrating an example of a configuration of a node state RAM according to one embodiment of the invention.

FIG. 3 is a block diagram illustrating an example of a configuration of a node state RAM according to one embodiment of the invention. For example, configuration 300 may be implemented as part of node state RAM 107 of FIG. 1. Referring to FIG. 3, configuration 300 includes, but not limited to, context H/T table 111, next GID table 112, and node state table 113. For purpose of illustration, certain reference numbers for certain components having identical or similar functionalities are retained throughout this application.

According to one embodiment, context H/T table 111 includes multiple records, which are indexed based on CIDs 301 of the contexts. Each record includes a head GID 302 and a tail GID 303. Head GID 302 identifies a data element or node at the head or top of a context (e.g., linked list) and tail GID 303 identifies a data element or node at the bottom or tail of the context. Thus, from context H/T table 111, a linked list processor can quickly obtain the head and/or tail nodes of a particular context based on the associated CID. This is useful for a linked list processor to "walk" through a linked list by obtaining the associated head GID and/or to insert a new node into the context by grabbing the associated tail GID.

In one embodiment, next GID table 112 includes multiple entries 305 indexed by GIDs 304, which represent current GIDs of the associated records. Each entry includes a next GID field 305 representing a next data element or node of a context with respect to a current node which is represented by the associated current GID 304. Thus, from next GID table 112, a linked processor can "walk" through the chain of a particular context based on current GID 304 and next GID 305. For example, for a context having a CID of 2 and nodes of 1-3-4, a linked list processor can obtain its associated head GID (e.g., 1) and tail GID (e.g., 4) from an entry (e.g., indexed at CID of 2) of context H/T table 111. Once the linked list processor obtains the head GID, it can "walk" through the chain from next GID table 112. When the linked list processor reaches the end of the chain, the associated current GID and next GID of the tail node may be identical. Similarly, if a particular context is empty, its head GID and tail GID may be identical (e.g., a predetermined value).

In one embodiment, node state table 113 includes multiple entries 307 index by GIDs 306, where each of entries 307 includes a value representing a current state of the corresponding node. When a linked list processor receives a command to be performed on a particular node of a particular linked list, the linked list processor can access node state table 113 based on a GID of the node to determine the current state of the node and whether an operation associated with the command should be performed at the point in time. Based on the current state of the node, the linked list processor may execute the command immediately or alternatively, defer the execution, for example, by marking the current state as a pending state, etc. Examples of node states and transitions among the node states are shown in FIGS. 4A and 4B.

According to some embodiments, commands for manipulating linked lists include, but not limited to, an enqueue command, a flush command, a reassign command, and a walk-the-chain (WTC) command. An enqueue command is used to enqueue a node or data element into a particular context (e.g., linked list). In one embodiment, an enqueue command includes a parameter identifying a node with a GID and a parameter identifying a context with a CID to which the node is enqueued. A flush command is used to indicate that operations associated with a particular node of a particular context have been completed. That is, the flushed node can be dequeued from a context if possible (e.g., at the top of the chain). A flush command includes a parameter identifying a node with a GID and a parameter identifying a context with a CID in which the node is flushed. A flush command may also include an attribute indicating whether a particular node should be released or put on-hold, for example, even if the node were on the top-of-chain (TOC) of the corresponding linked list.

In one embodiment, a WTC command is used to instruct a linked list processor to go through the chain of a particular context to identify a node that may have a job pending and attempt to complete the pending job. A WTC command includes a CID identifying a context through which a linked processor is to go through. A WTC command may also include an attribute indicating whether a particular node should be released or put on-hold, for example, even if the node were on the top-of-chain (TOC) of the corresponding linked list. A reassign command is used to reassign a particular node from one context to another context. A reassign command includes a GID identifying a node to be reassigned, a first CID identifying a first context from which the node is reassigned (e.g., dequeued), and a second CID identifying a second context to which the node is reassigned (e.g., enqueued).

Figure 4A:
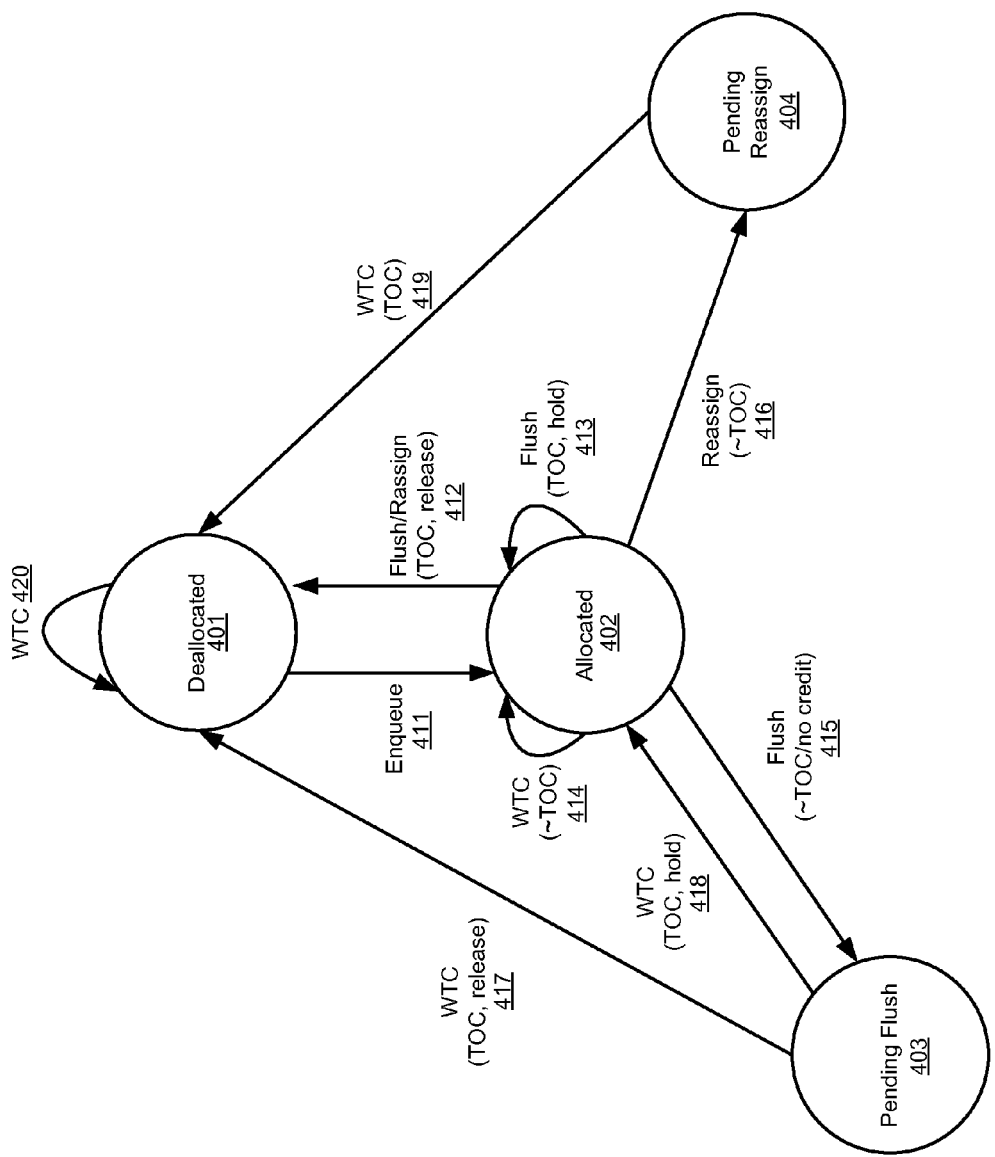
FIGS. 4A and 4B are state diagrams illustrating transitions among node states according to some embodiments of the invention.
Figure 4B:
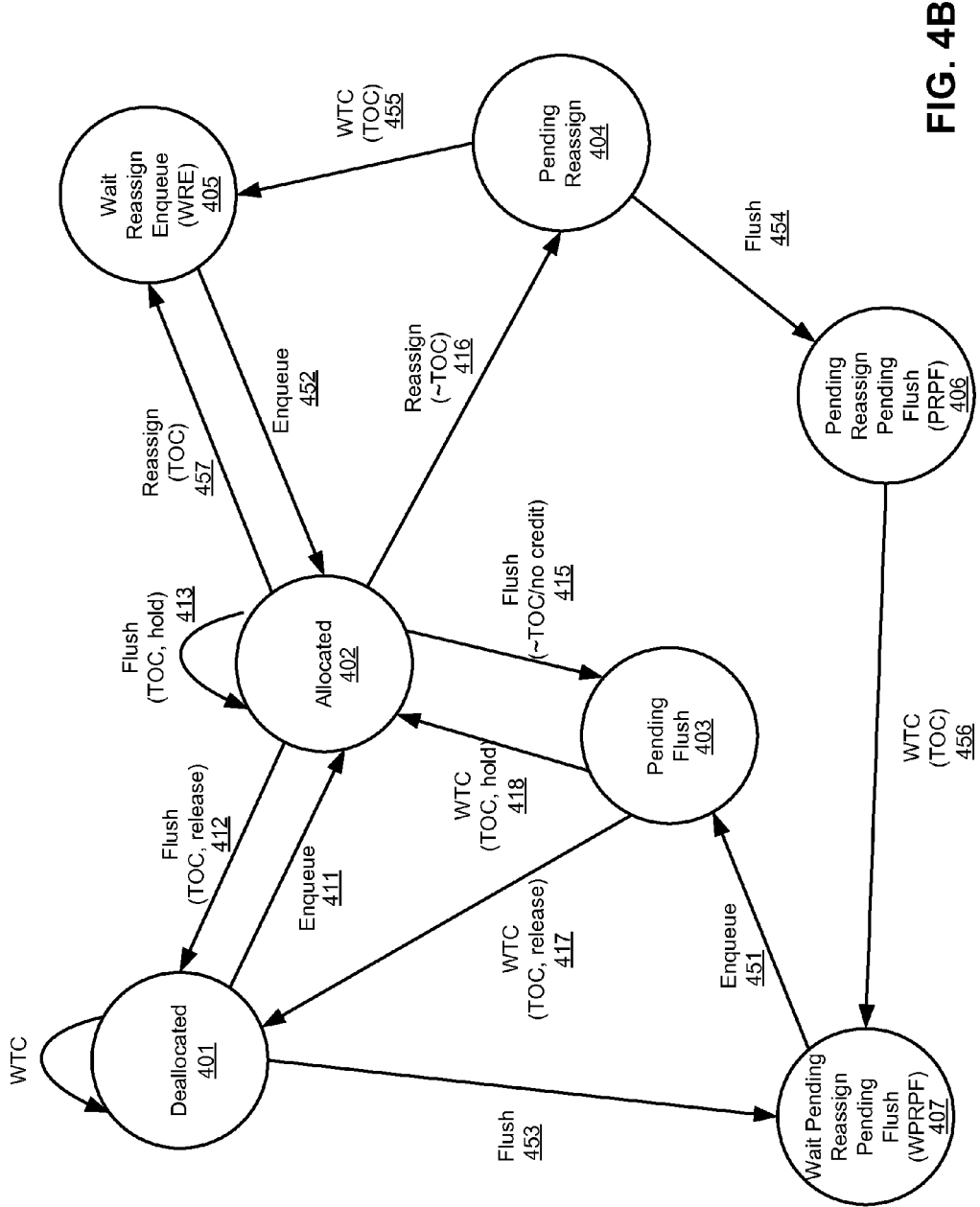

FIGS. 4A and 4B are state diagrams illustrating some node states which can be used with an embodiment of the invention. Note that state diagrams as shown in FIGS. 4A and 4B may be implemented in a single state diagram as part of node state table 113. For purpose of illustration, the state diagram is split into two state diagrams in view of two different linked list processors, for example, for processing a reassign command. The states of a node can be in one of, but not limited to, deallocated state 401, allocated state 402, pending-flush (PF) state 403, pending-reassign (PR) state 404, wait-reassign-enqueue (WRE) state 405, pending-reassign-pending-flush (PRPF) state 406, and wait-pending-reassign-pending-flush (WPRPF) state 407. These states are used by linked list processors to independently determine whether a particular command or instruction should be executed given the current state. If a particular command cannot be executed at the point in time, the state of the node may be changed to another state, for example, indicating a pending operation to be performed subsequently, for example, via another WTC transaction.

Referring to FIGS. 4A and 4B, when a linked list processor receives an enqueue command for enqueuing a node identified by a GID into a context identified by a CID, according to one embodiment, the linked list processor may look up an entry in node state table 113 based on the GID to determine the current state of the node. If the current state of the node is in deallocated state 401, the linked list processor enqueues or inserts the node into the tail of the context identified by the CID and changes the state of the node from the deallocated state to allocated state 402 via path 411.

According to one embodiment, in response to an enqueue command received at a linked list processor to enqueue a node identified by a GID into a context identified by a CID, the linked list processor may look up at the node state table to determine the current state of the node. If the state of the node is in a deallocated state, the linked list processor may look up at a context H/T table based on the CID to locate an entry corresponding to the CID. If the entry exists, the linked list processor obtains a tail GID from the corresponding entry of the context H/T table and updates a next GID field of an entry associated with the tail GID in the next GID table. In addition, the linked list processor also updates an entry corresponding to the GID of the enqueue command in the next GID table. In this example, since the new node identified by the GID from the enqueue command is the new tail node of the context, the next GID field of the entry associated with the enqueued node is identical to the current GID field. The tail GID field of the context H/T table is updated with the GID from the enqueue command and the state of the new node is updated from a deallocated state to an allocated state in the node state table (e.g., via path 411 of FIG. 4A).

If there is no existing record in the context H/T table corresponding to the CID received from the enqueue command, a new context is to be created. In this situation, the head GID and tail GID in a record corresponding to the CID received from the enqueue command are updated, both containing the GID received from the enqueue command. In addition, a record corresponding to the GID in the next GID table is also updated, where both the current GID and next GID are identical. Further, the state of the newly enqueued node is set to an allocated state (e.g., via path 411 of FIG. 4A).

According to one embodiment, if the current state of the node is not in an allocated state when an enqueue command is received, it could be in either a WPRPF state or a WRE state; otherwise, the enqueue command may be received as an error. Referring to FIG. 4B, if the current state is in WPRPF state 407 or WRE state 405 when the enqueue command is received, processing logic may change the current state to pending-flush state 403 via paths 451-452, respectively.

Referring back to FIG. 4A, according to one embodiment, when a linked list processor receives a flush command for flushing a node identified by a GID of a context identified by a CID, also referred to as Flush (GID, CID) command, the linked list processor accesses the note state table based on the GID to determine the current state of the node. In addition, the linked list processor also accesses the context H/T table based on the CID to determine whether the node is at the TOC position of the context by matching the head GID and the GID of the node. If the current state of the node is in an allocated state; node is at the TOC position; and the flush command includes a released attribute or option (e.g., Flush (GID, CID, release)), the node is dequeued from the context and its state is changed from the allocated state to a deallocated state via path 412. If the current state of the node is in an allocated state; node is at the TOC position; and the flush command includes a hold attribute or option (e.g., Flush (GID, CID, hold)), the linked list processor may do nothing and the state of the node remains in the allocated state via path 413. If the current state of the node is the allocated state, but not at the TOC position or the destination is not ready to receive the node, the linked list processor may mark the state of the node to a pending-flush state 403 via path 415.

According to another embodiment, after dequeuing a node (GID) from the TOC of a context (CID), a WTC (GID, CID) command is issued. When a linked list processor receives a WTC (GID, CID) command, according to one embodiment, the linked list processor accesses the note state table based on the GID to determine the current state of the node. In addition, the linked list processor may also access the context H/T table based on the CID to determine whether the node is at the TOC position of the context by matching the head GID and the GID of the node. If the current state of the node is in deallocated state 401, it means the node has been dequeued from the context in which case, the linked list processor may do nothing and the state of the node remains as deallocated state 401 via path 420. Similarly, if the current state of the node is in allocated state 402, but the node is not at the TOC position, the linked list processor may skip processing the node and the node remains in allocated state 402 via path 414. In this situation, the node is not ready to be dequeued.

If the current state of the node is in pending-flush state 403; the node is at the TOC position; and the WTC command includes a release attribute (e.g., WTC (GID, CID, release)), the node is dequeued from the context and the state of the node is changed to deallocated state 401 via path 417. In this situation, the node was ready to be dequeued by a flush command in a previous cycle, but the node was blocked from being dequeued at the time (e.g., it was not at TOC position). Now the node is at the TOC position and ready to be dequeued. If the current state of the node is in pending-flush state 403; the node is at the TOC position; and the WTC command includes a hold attribute (e.g., WTC (GID, CID, hold)), the linked list processor may skip processing the flush command and the state of the node is changed to allocated state 402 via path 418. If the current state of the node is in pending-reassign state 404 and the node is at the TOC position, the node is dequeued from the context and the state of the node is changed to deallocated state 401 via path 419.

According to one embodiment, in response to a WTC (CID) command, a head GID is retrieved from a context H/T table. The node state table is accessed to determine whether the current node identified by a current GID is pending to be deallocated (e.g., pending flush or pending reassign) and the node is at the TOC position of the context. If so, it is determined whether the destination is ready to receive the node. If not, a retry command is issued. Otherwise, the node is dequeued from the context. The context H/T table, the next GID table, and the node state table are updated accordingly. The above operations are performed repeatedly until the end of the chain (e.g., the current GID matches the next GID in the next GID table).

As described above, a node of a context can be reassigned to another context based on a variety of factors. When a node is reassigned, basically, the node is dequeued from the original context and enqueued into another context. In one embodiment, at least two linked list processors are coupled in pipeline to process a reassign command, where the first linked list processor is configured to dequeue the node identified by a GID from a first context identified by a first CID (CID1) while the second linked list processor is configured to enqueue the node into a second context identified by a second CID (CID2).

Referring back to FIGS. 4A and 4B, where FIG. 4A represents a state diagram in view of the first linked list processor and FIG. 4B represents a state diagram in view of the second linked list processor. Note that both state diagrams can be stored in the same node state table 113, but shown in different state diagrams in view of different linked list processors for the purpose of illustration only. In one embodiment, when a first linked list processor receives a reassign command for reassigning a GID from CID1 to CID2 (e.g., Reassign (GID, CID1, CID2)), referring to FIG. 4A, the first linked list processor accesses the node state table based on the GID to determine the current state of the node. If the current state of the GID is in allocated state 402 and the GID is at the TOC of the CID 1, the GID is dequeued from CID1 and its state is changed to deallocated state 401 via path 412. If the current state of the GID is in allocated state 402, but the GID is not at the TOC of CID1, the state of the GID is changed to pending-reassign state 404 via path 416 without dequeuing the GID. In this situation, the GID is blocked (e.g., by a parent node) from being dequeued from CID1. Eventually, when the block is cleared, a WTC command will be issued in which case, the GID will be dequeued via path 419, which may be performed by the same linked list processor or another linked list processor.

Meanwhile, referring to FIG. 4B, a second linked list processor receives an enqueue command (dispatched from the reassign command, also referred to as a reassign enqueue command) to enqueue the GID to CID2. The second linked list processor accesses the node state table based on the GID to determine the current state of the GID. If the current state of the GID is in deallocated state 401 (e.g., already dequeued from CID1 by the first processor), the GID is enqueued into CID2 using, inter alia, techniques described herein and its state is changed to allocated state 402 via path 411. If the current state of the GID is not in deallocated state 401, the linked list processor exits.

According to one embodiment, when a linked list processor receives a reassign command the same linked list processor could process all of the operations involved in the reassign process. For example, after enqueuing a node into a context in response to a reassign command, such as Reassign (GID, CID1, CID2), processed by a previous processor in the pipeline, another reassign command, Reassign (GID, CID2, CID3), may be received by the current processor. In some configurations, due to the availability of the linked list processors, according to one embodiment, the current linked list processor may process the Reassign (GID, CID2, CID3) command without involving another linked list processor.

In this situation, after a node (GID) has been enqueued into a context in response to a first reassign command, it is assumed that the GID is in allocated state 402. When a linked list processor receives a second reassign command, Reassign (GID, CID2, CID3), if the GID is at the TOC of CID2, the linked list processor can immediately dequeue the GID from CID2 and change the state to WRE state 405 via path 457 for pending to be enqueued into CID3. Subsequently, an enqueue command is issued to enqueue the GID into CID3 (e.g., Enqueue (GID, CID3)), which transition the state from WRE state 405 to allocated state 402 via path 452. If the GID is not at the TOC of CID2, the linked list processor may change the state of the GID to pending reassign state 404 via path 416. In this situation, the GID eventually will be processed and completed by another WTC command when it is at the TOC of CID2, in which case the GID will be transitioned to WRE state 405 via path 455 to be enqueued into CID3 via path 452.

While a node is pending to be reassigned, it is possible that a flush command, Flush (GID, CID3), may be received by the linked list processor. In this situation, since the GID has not been enqueued into CID3 and is still at the pending-reassign state 404, the new flush command has to be deferred. Thus, the linked list processor may change the state of the GID to PRPF state 406 via path 454. While at PRPF state 406, if another WTC is received and the GID is now at the TOC of CID3, the GID is transitioned to WPRPF state 407 via path 456. While at WPRPF state 407, if an enqueue command is received, the GID is finally enqueued into CID3, but is subject to a flush command from CID3. As a result, the GID is transitioned to pending-flush state 403 via path 451. If the GID is at deallocated state 401 while a flush command, i.e., Flush (GID, CID3), is received, it means that the GID has been dequeued from CID2. As a result, the GID is transitioned to WPRPF state 407 via path 453.

According to one embodiment, when a reassign command is received at a linked list processor (e.g., a first linked list processor) for reassigning a GID from CID1 to CID2, the linked list processor determines whether the GID is at the TOC of CID1, for example, by matching the GID with a head GID of CID1 via context H/T table. If the GID is not at the TOC of CID1, the execution of the reassign command has to be deferred by marking the node state of the GID as a pending-reassign state. If the GID is at the TOC of CID1, the GID is dequeued from the CID1 and the node state of GID is changed to a deallocated state. Thereafter, an enqueue command is issued to a second linked list processor for enqueuing the GID into CID2.

When a second linked list processor receives an enqueue command for enqueuing a GID into CID2, the linked list processor accesses the node state table to determine whether the current state of GID is in a deallocated state. If so, the GID is enqueued into CID2 and the state of the GID is changed to an allocated state. If the current state is not in a deallocated state, it is determined whether the GID is in a WRE state. If so, the GID is enqueued into CID2 and the state of the GID is changed to an allocated state. If the current state of GID is not in the WRE state, it is determined whether the current state of GID is in a WPRPF state. If so, the state of the GID is changed to a pending-flush state without enqueuing the GID. Otherwise, the linked list processor exits.

FIG. 5 is a flow diagram illustrating a method for processing a reassign command of a linked list according to one embodiment of the invention. Note that method 500 may be performed by processing logic which may include hardware, firmware, software embodied on a non-transitory computer readable medium, or a combination thereof. For example, method 500 may be performed by processing pipeline as shown in FIG. 2. Referring to FIG. 5, at block 501, a reassign command is received for reassigning a node identified by a GID from a first linked list to a second linked list. The first linked list is identified by a first CID and the second linked list identified by a second CID, where the first and second linked lists represent a first and second contexts, respectively. At block 502, a WTC command specifying the GID and the first CID is issued on the first context to a first linked list processor, where the first linked list processor is configured to dequeue the node from the first linked list. At block 503, an enqueue command specifying the GID and the second CID is issued on the second context to a second linked list processor, where the second linked list processor is configured to insert the node into the second linked list. The first and second linked list processors are cascaded to form a pipeline. The linked list processors are configured to access a set of one or more tables (e.g., the context H/T table, next GID table, and/or the node state table described above) that are shared by the linked list processors and that store data identifying the sequence of the nodes in each of the linked lists and a status of each of the nodes. As a result, separating the first node's reassignment into the two commands executed in a pipelined manner by two linked list processors cascaded to form a pipeline reduces reassignment based pipeline stalls.

FIG. 6 is a flow diagram illustrating a method for processing a WTC command according to one embodiment of the invention. Referring to FIG. 6, at block 601, the GID of the node at a head of the first linked list is retrieved from the context H/T table based on the first CID. The context H/T table includes multiple records, each corresponding to one of the linked lists. Each record contains the GIDs of the nodes representing the head and a tail of the corresponding linked list, respectively. At block 602, it is determined whether the first node is located at the head of the first linked list by matching that head node's GID with the GID of the node. At block 603, if the GID of the node matches the head node's GID, the node is dequeued from the first linked list and the node state if the node is set to a deallocated state in the node state table. At block 604, if the GID of the node does not match the head node's GID, the node state of the node is changed to a pending reassign state in the node state table, without dequeuing the node.

FIG. 7 is a flow diagram illustrating a method for enqueuing a node into a context according to one embodiment of the invention. Referring to FIG. 7, at block 701, processing logic determines a node state of a first node from a node state table based on a first GID associated with the first node. At block 702, the first node is enqueued into a second linked list identified by a second CID if the node state of the first node is in a deallocated state. At block 703, the node state of the first GID is changed to an allocate state in the node state table if the first node was queued into the second linked list.

As described above, when a node is dequeued from a context, the data associated with the node is transmitted to a destination or next processing stage (e.g., egress buffer). However, due to a variety of reasons, the destination may not be ready (e.g., not enough credits) to receive such data. As a result, the processing pipeline may stall. According to one embodiment, under such circumstances, the dequeue operations may be deferred by issuing a retry command. The retry command causes the processing pipeline to reprocess the same command subsequently when the destination is ready or available.

Figure 8:
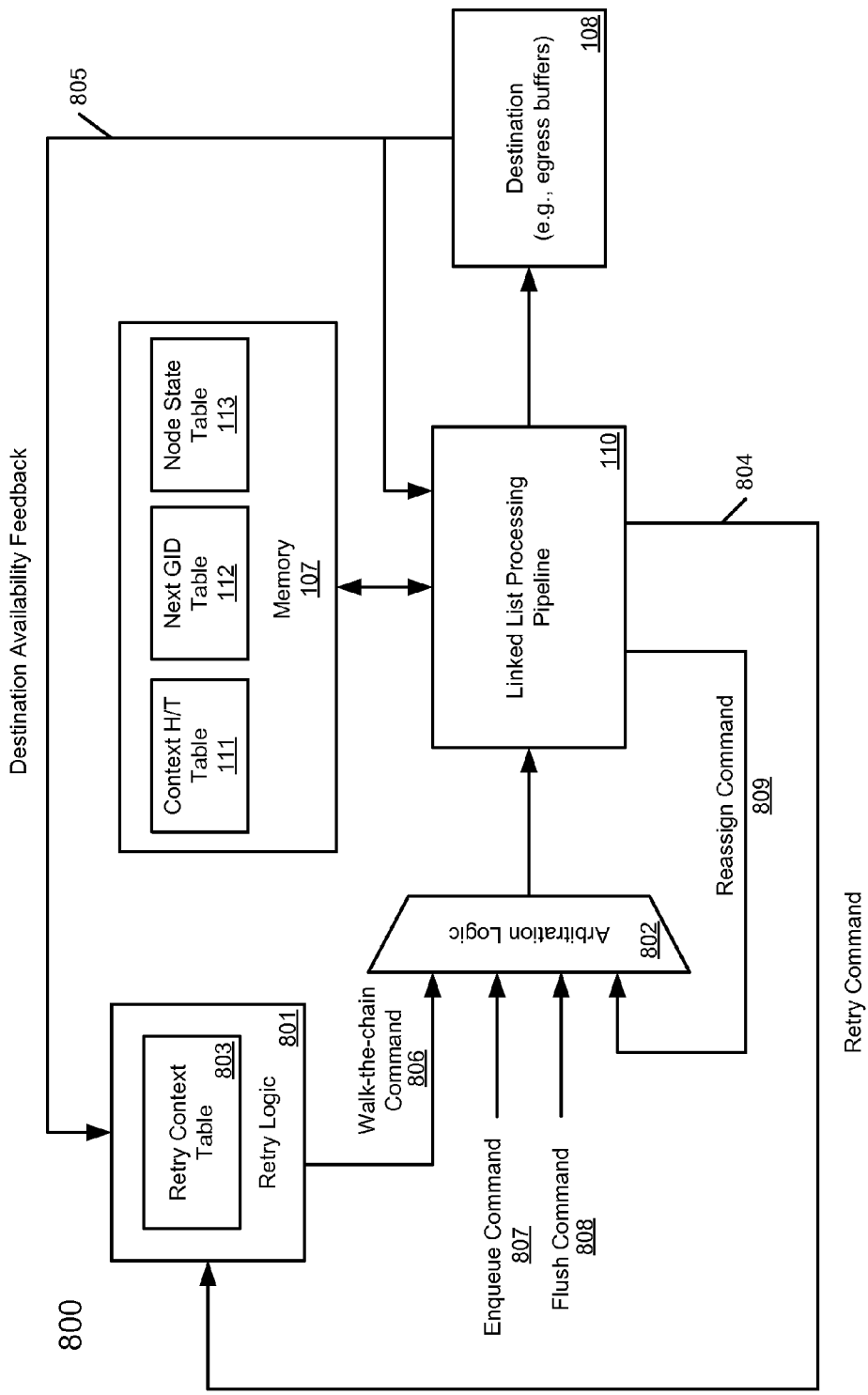
FIG. 8 is a block diagram illustrating a system for processing a retry command according to one embodiment of the invention.

FIG. 8 is a block diagram illustrating a mechanism for retrying commands in a linked list processing pipeline according to one embodiment. Referring to FIG. 8, similar to system 100 as shown in FIG. 1, system 800 includes, but not limited to, linked list processing pipeline 110 having one or more linked list processors to process one or more linked lists using information stored in memory 107 (e.g., context H/T table, next GID table, and node state table), where the results of the processes are transmitted to destination 108. System 800 further includes arbitration logic 802 to arbitrate multiple linked list commands, such as, for example, WTC command 806, enqueue command 807, flush command 808, and reassign command 809.

In addition, according to one embodiment, system 800 further includes a context retry logic 801 associated with a retry context table 803. In one embodiment, the retry context table 803 includes multiple entries, each corresponding to a context. When a retry command is issued to a particular context, retry logic 801 may store a predetermined value into the corresponding entry of that context. In one embodiment, retry table 803 is implemented as a bitmap having multiple bits, each bit corresponding to a context which may have a pending operation or command to be executed. For example, bit 0 corresponds to context 0; bit 1 corresponds to context 1, and so on. When a bit of the retry bitmap has a predetermined logical value, such as, for example, logical value one, it indicates that there is at least one action or command pending to be finished for the associated context.

In one embodiment, when processing pipeline 110 attempts to dequeue a node (GID) from a context (CID), but destination 108 is not ready to receive data of the GID, processing pipeline 110 is configured to mark, via path 804, the corresponding bit associated with the CID in the retry bitmap to a predetermined logical value. Subsequently, when context retry logic 801 receives a feedback, via path 805, from destination 108 indicating that destination 108 is ready to receive more data, context retry logic 801 is configured to scan the bits of the retry bitmap to identify any bit that has been set to the predetermined logical value. For those bits having the predetermined logical value, a WTC command may be issued on the corresponding contexts. For example, if bit 3 of the retry bitmap has a logical value of one, a WTC (3) command may be issued, where CID is 3 herein. The WTC command may cause one of the linked list processors in linked list processing pipeline 110 to complete the pending operations on the context. Note that the retry table 803 is described for the purpose of illustration only; other data structures such as a table may also be utilized.

Figure 9:
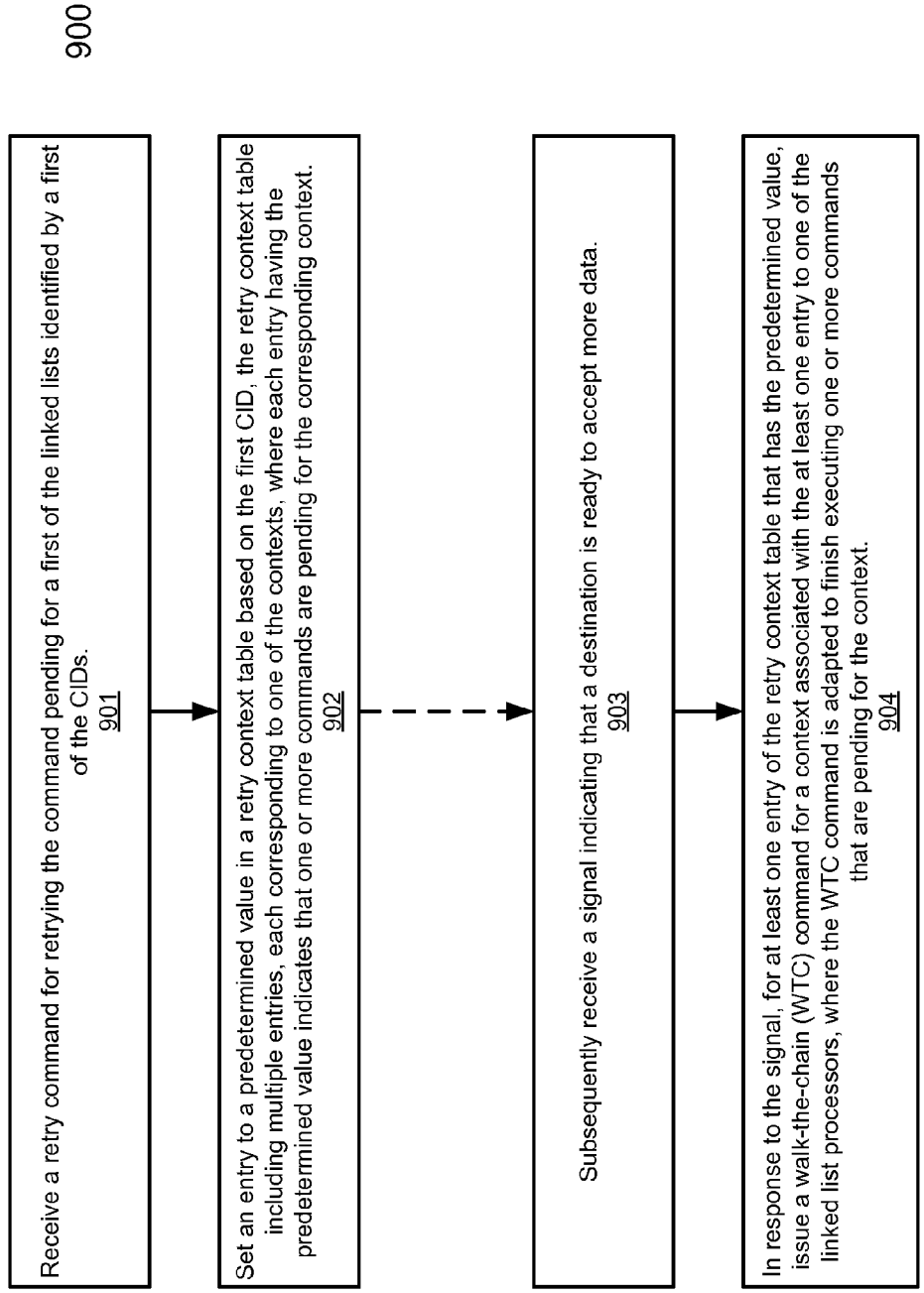
FIG. 9 is a flow diagram illustrating a method for processing a retry command according to one embodiment of the invention.

FIG. 9 is a flow diagram illustrating a method for processing a retry command according to one embodiment of the invention. For example, method 900 may be performed by system 800 of FIG. 8. Referring to FIG. 9, at block 901, a retry command is received for retrying one or more commands pending for a linked list identified by a CID. In response to the retry command, at block 902, a context retry table is updated based on the CID by setting the corresponding entry to a predetermined value, which indicates that there is at least one command pending for the context. Subsequently, at block 903, a signal fed back from the destination is received indicating that the destination is ready to accept more data. At block 904, a WTC command is issued for at least one entry that has a predetermined value indicating that at least one pending operation to be retried.

Figure 10:
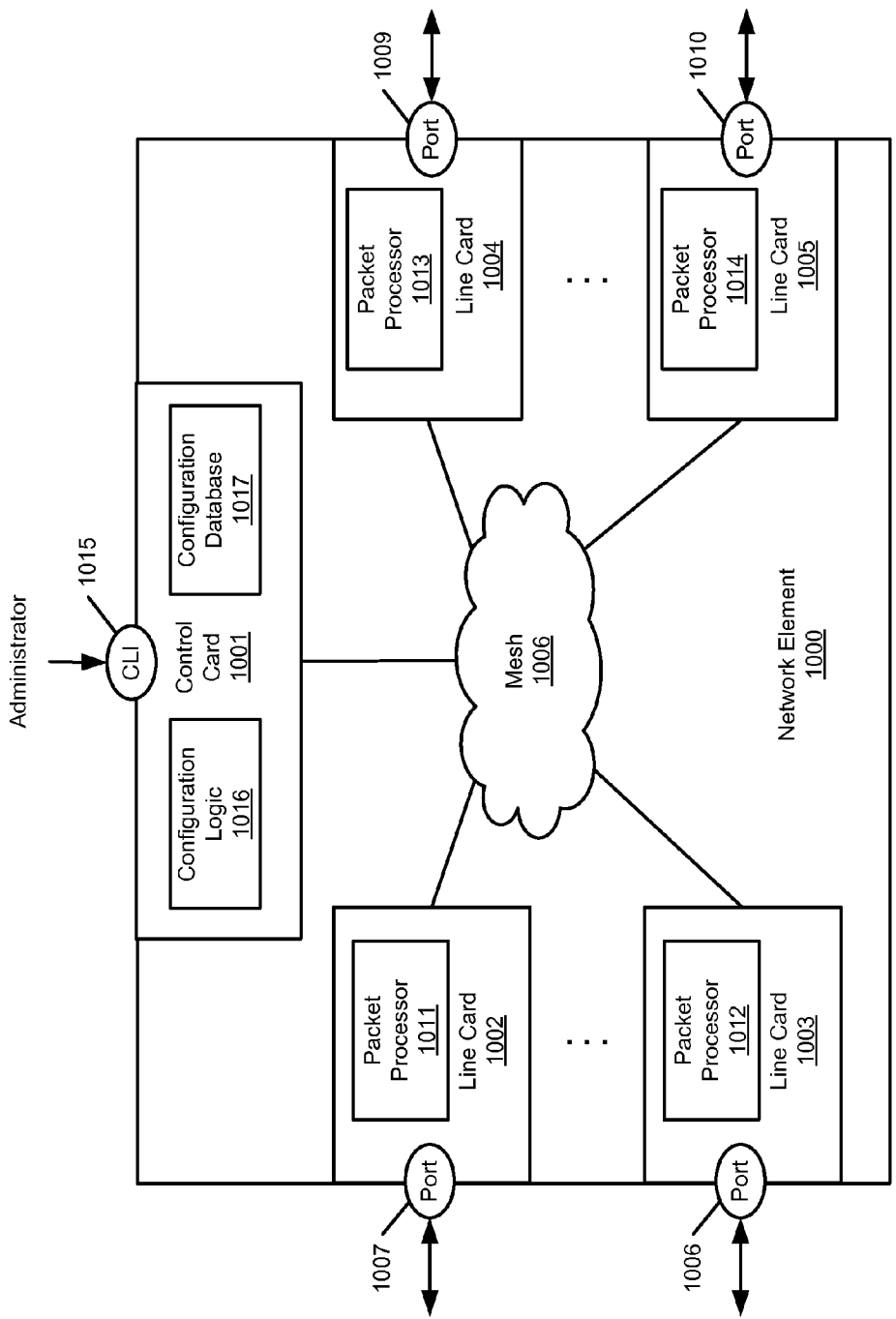
FIG. 10 is a block diagram illustrating a network element according to one embodiment of the invention.

FIG. 10 is a block diagram illustrating a network element 1000 according to one embodiment of the invention. At least one of the line cards 1002-1005 may include a packet processing device having a linked list processing pipeline described above. In one embodiment, network element 1000 includes, but is not limited to, a control card 1001 (also referred to as a control plane) communicatively coupled to one or more line cards 1002-1005 (also referred to as interface cards or user planes) over a mesh 1006, which may be a mesh network, an interconnect, a bus, or a combination thereof. A line card is also referred to as a data plane (sometimes referred to as a forwarding plane or a media plane). Each of the line cards 1002-1005 is associated with one or more interfaces (also referred to as ports), such as interfaces 1007-1010 respectively. Each line card includes a packet processor, routing functional block or logic (e.g., blocks 1011-1014) to route and/or forward packets via the corresponding interface according to a configuration (e.g., routing table) configured by control card 1001, which may be configured by an administrator via an interface 1015 (e.g., a command line interface or CLI). According to one embodiment, control card 1001 includes, but is not limited to, configuration logic 1016 and database 1017 for storing information configured by configuration logic 1016.

In the case that network element 1000 is a router (or is implementing routing functionality), control plane 1001 typically determines how data (e.g., packets) is to be routed (e.g., the next hop for the data and the outgoing port for that data), and the data plane (e.g., lines cards 1002-1003) is in charge of forwarding that data. For example, control plane 1001 typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), and one or more adjacency structures) on the control plane (e.g., database 1008). Control plane 1001 programs the data plane (e.g., line cards 1002-1003) with information (e.g., adjacency and route information) based on the routing structure(s). For example, control plane 1001 programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main routing information base (RIB) based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element 1000 can store one or more bridging tables that are used to forward data based on the layer 2 information in this data.

Typically, a network element may include a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (e.g., GGSN, Evolved Packet System (EPS) Gateway). By way of example, a service card may be used to terminate IPsec tunnels and execute the attendant authentication and encryption algorithms. As used herein, a network element (e.g., a router, switch, bridge) is a piece of networking equipment, including hardware and software, that communicatively interconnects other equipment on the network (e.g., other network elements, end stations, terminals). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, netbooks, palm tops, mobile phones, smart phones, multimedia phones, Voice Over Internet Protocol (VOIP) phones, user equipment, terminals, portable media players, global positioning system (GPS) units, gaming systems, set-top boxes) access content/services provided over the Internet and/or content/services provided on virtual private networks (VPNs) tunneled through the Internet. The content and/or services are typically provided by one or more end stations (e.g., server end stations) belonging to a service or content provider or end stations participating in a peer to peer service, and may include public Web pages (e.g., free content, store fronts, search services), private Web pages (e.g., username/password accessed Web pages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Note that network element 1000 is described for the purpose of illustration only. More or fewer components may be implemented dependent upon a specific application. For example, although a single control card is shown, multiple control cards may be implemented, for example, for the purpose of redundancy. Similarly, multiple line cards may also be implemented on each of the ingress and egress interfaces. Also note that some or all of the components as shown may be implemented in hardware, software (embodied on a non-transitory computer readable medium), or a combination of both.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method in a network processor for reassigning nodes between a plurality of linked lists, each linked list representing a reorder context identified by a context identifier (CID), each context used to group packets and determine the order for processing the packets within each group, each linked list having a sequence of nodes, and each node being identified by a unique global identifier (GID), the method comprising the steps of:

receiving by one of a plurality of linked list processors a reassign command for reassigning a first of the nodes that is identified by a first of the GIDs from a first of the linked lists identified by a first of the CIDs to a second of the linked lists identified by a second of the CIDs, the first and second linked lists representing a first and a second of the contexts, respectively;

issuing a walk-the-chain (WTC) command specifying the first GID and the first CID to a first of the linked list processors, wherein the first linked list processor is configured to dequeue the first node from the first linked list; and issuing an enqueue command specifying the first GID and the second CID to a second of the linked list processors, wherein the second linked list processor is configured to insert the first node into the second linked list, and wherein the first and second linked list processors are cascaded to form a pipeline, wherein the linked list processors are configured to access a set of one or more tables that are shared by the linked list processors and that store data identifying the sequence of the nodes in each of the linked lists and a status of each of the nodes, whereby separating the first node's reassignment into the two commands executed in a pipelined manner by two linked list processors cascaded to form a pipeline reduces reassignment based pipeline stalls.

2. The method of claim 1, wherein the set of one or more tables comprise: a context head and tail (H/T) table having a plurality of records each corresponding to one of the linked lists, each of the records containing the GIDs of the nodes representing a head and a tail of the corresponding linked list, respectively;

a next GID table having a plurality of records corresponding to the nodes of the plurality of liked lists, each of the next GID table's records having a current GID entry storing the GID identifying a current one of the nodes and having a next GID entry storing the GID identifying a next of the nodes of the corresponding linked list; and a node state table having a plurality of entries corresponding to the nodes identified by the GIDs, each entry storing a status of one of the nodes.

3. The method of claim 2, wherein in response to the WTC command, the first linked list processor is configured to perform the steps of:

retrieving the GID of the node at a head of the first linked list from the context H/T table;

determining whether the first node is located at the head of the first linked list by matching that head node's GID with the first GID;

if the first GID matches that head node's GID, then performing the steps of:

dequeuing the first node from the first linked list; and setting a node state of the first node to a deallocated state in an entry identified by the first GID of the node state table;

if the first GID does not match that head node's GID, changing the node state of the first node to a pending-reassign state in the node state table.

4. The method of claim 3, wherein the first linked list processor is configured to further perform the steps of:

receiving a second WTC command with the first GID and first CID subsequently;

in response to the second WTC command, performing the steps of:

determining whether the first node is at the head of the first linked list;

if the first node is at the head of the first linked list, performing the steps of:

dequeuing the first node from the first context; and changing the node state of the first node in the entry identified by the first GID to a deallocated state in the node state table.

5. The method of claim 3, wherein the first linked list processor is configured to perform the steps of:

determining whether destination logic is available to receive data of the first node to be dequeued from the first linked list; and issuing a retry command without dequeuing the first node from the first linked list if the destination logic is unavailable.

6. The method of claim 3, wherein if the first node has been dequeued from the first linked list, the method further comprises the steps of:

retrieving a next GID from the next GID table based on the first GID being a current GID;

attempting to dequeue a node associated with the next GID; and repeating the steps of retrieving a next GID and attempting to dequeue a node of the next GID, until a node associated with the next GID cannot be dequeued or the end of the first linked list has been reached.

7. The method of claim 2, wherein in response to the enqueue command, the second linked list processor is configured to perform the steps of:
   determining a node state of the first node from the node state table based the first GID;
   enqueuing the first node into the second context identified by the second CID if the node state of the first GID is in a deallocated state; and
   changing the node state of the first GID to an allocated state in the node state table if the first node was enqueued into the second linked list.

8. The method of claim 7, wherein the step of enqueuing the first node into the second context comprises the steps of:
   retrieving the GID of the node at a tail of the second linked list from the context head and tail (H/T) table based on the second CID;
   storing the first GID in a next GID entry of a record associated with the second linked list's tail GID in the next GID table; and
   storing an end of linked list indication in the next GID entry of the record associated with the first GID in the next GID table.

9. The method of claim 2, wherein the second linked list processor is configured to further perform the steps of:
   receiving a second reassign command to reassign the first node from the second linked list to the linked list identified by a third CID;
   changing the node state of the first GID to a wait-reassign-enqueue (WRE) state if the node state of the first GID is currently in an allocated state and the first node is currently at the head of the second linked list; and
   changing the node state of the first GID to a pending reassign state if the node state of the first GID is currently in the allocated state and the first node is not currently at the head of the second linked list.

10. The method of claim 9, wherein the second linked list processor is configured to further perform the steps of:
    receiving a second enqueue command to enqueue the first node into the third linked list;
    enqueuing the first node into the third linked list if the node state of the first node is currently at the WRE; and
    changing the node state of the first node to the allocated state if the first node was enqueued into the third linked list.

11. The method of claim 9, wherein the second linked list processor is configured to further perform the steps of:
    in response to a flush command with the first GID, changing the node state of the first node to a pending-reassign-pending-flush (PRPF) state in the node state table if the node state of the first node is currently in the pending-reassign state; and
    in response to a third WTC command with the first GID, changing the node state of the first node to a wait-pending-reassign-pending-flush (WPRPF) state in the node state table if the node state of the first node is currently in the PRPF state.

12. The method of claim 11, wherein the second linked list processor is configured to further perform the steps of:
    in response to a second enqueue command with the first GID, changing the node state of the first node to a pending flush state in a node state table if the node state of the first node is currently in the WPRPF state;
    in response to a fourth WTC command with the first GID, dequeuing the first node from the second linked list if the first GID is at the head of the second context and the node state of the first node is currently in the pending flush state; and
    changing the node state of the first node to the deallocated state in the node state table.

13. The method of claim 1, further comprising the steps of:
    receiving at a retry logic a retry command with a third CID from one of the first and second linked list processors when a destination logic is not ready to receive data associated with a third of the linked lists identified by the third CID; and
    storing a predetermined value in an entry of a retry context table corresponding to the third CID, the retry context table having a plurality of entries, each corresponding to a context.

14. The method of claim 13, further comprising the steps of: receiving at the retry logic a signal indicating that the destination logic is ready to accept further data; and for each entry of the retry context table having the predetermined value, the retry logic issuing a WTC command with a CID associated with the respective entry to at least one of the first and second linked list processors.

15. A network processor for reassigning nodes between a plurality of linked lists by using a plurality of linked list processors to improve an efficiency of processing the plurality of linked lists, the network processor comprising:
    a plurality of execution units to execute instructions to process data associated with the plurality of linked lists, each linked list representing a context identified by a context identifier (CID), each such context used to allow the network processor to group network packets and determine the order for processing the network packets within each group, and each linked list to have a sequence of nodes, each node being identified by a unique global ID (GID); and
    a reordering unit coupled to the execution units, the reordering unit including the plurality of linked list processors, the plurality of linked list processors including: a first linked list processor, responsive to a walk-the-chain (WTC) command specifying a first of the GIDs identifying a first of the nodes and specifying a first of the CIDs identifying a first of the linked lists, configured to access one or more nodes of the first linked lists to dequeue the first node from the first linked list, and
    a second linked list processor, responsive to an enqueue command specifying the first GID and specifying a second of the CIDs identifying a second of the linked lists, configured to insert the first node into the second linked list, wherein the first and second linked list processors are cascaded to form a pipeline, and wherein the linked list processors are configured to access a memory storing a set of one or more tables that are shared by the linked list processors and that store data identifying the sequence of the nodes in each of the linked lists and a status of each of the nodes; and
    wherein the reordering unit, responsive to a reassign command for reassigning the first node identified by the first GID from the first linked list identified by the first CID to the second linked list identified by the second CID, to respectively issue the WTC command and the enqueue commands to the first and second linked list processors, whereby separating the first node's reassignment into the two commands executed in a pipelined manner by two linked list processors cascaded to form a pipeline reduces reassignment based pipeline stalls.

16. The network processor of claim 15, wherein the set of one or more tables comprise:
- a context head and tail (H/T) table having a plurality of records each corresponding to one of the linked lists, each of the records containing the GIDs of the nodes representing a head and a tail of the corresponding linked list, respectively;
- a next GID table having a plurality of records corresponding to the nodes of the plurality linked lists, each of the next GID table's record having a current GID entry storing the GID identifying a current one of the nodes and having a next GID entry storing the GID identifying a next of the nodes of the corresponding linked list; and
- a node state table having a plurality of entries, each corresponding to one of the GIDs storing a status of one of the GIDs.

17. The network processor of claim 16, wherein in response to the WTC command, the first linked list processor is configured to:
- retrieve the GID of the node at a head of the first linked list from the context H/T table based on the first CID;
- determine whether the first node is located at the head of the first linked list by matching its head node's GID with the first GID;
- if the first GID matches the head node's GID, then perform the steps of:
  - dequeue the first node from the first linked list; and
  - set a node state of the first node to a deallocated state in an entry identified by the first GID of a node state table.

18. The network processor of claim 17, wherein the first linked list processor is configured to
- determine whether destination logic is available to receive data of the first node to be dequeued from the first linked list; and
- issue a retry command without dequeuing the first node from the first context if the destination logic is unavailable.

19. The network processor of claim 18, further comprising:
- a retry logic; and
- a retry context table having a plurality of entries, each corresponding to one of the contexts, wherein in response to the retry command, the retry logic is configured to set an entry corresponding to the first context to a predetermined value, and wherein in response to a signal indicating that the destination logic is ready to accept data, the retry logic is configured to scan each entry of the retry context table, and for each entry having the predetermined value to issue a WTC command to one of the linked list processors.

20. A machine-implemented method for retrying a command for processing one of a plurality of nodes of a linked list, each linked list representing a context identified by a context identifier (CID) and having a sequence of nodes, and each node being identified by a unique global identifier (GID), wherein the command was previously issued to one of a plurality of linked list processors and could not be completed because a destination to receive a result of the command was unavailable, the method comprising the steps of:
- Receiving, in a network processor, a retry command for retrying the command pending for a first of the linked lists identified by a first of the CIDs; setting an entry to a predetermined value in a retry context table based on the first CID, the retry context table including a plurality of entries, each corresponding to one of the contexts, wherein each entry having the predetermined value indicates that one or more commands are pending for the corresponding context; subsequently receiving a signal indicating that a destination is ready to accept more data; and in response to the signal, for at least one entry of the retry context table that has the predetermined value, issuing a walk-the-chain (WTC) command for a context associated with the at least one entry to one of the linked list processors, wherein the WTC command is configured to finish executing one or more commands that are pending for the context.

21. The method of claim 20, wherein the retry context table comprises a bitmap having a plurality of bits, each corresponding to one of the contexts, and wherein a bit having a predetermined logical value indicates that there is at least one command currently pending for a corresponding context.

* * * * *

UNITED STATES PATENT AND TRADEMARK OFFICE
CERTIFICATE OF CORRECTION

PATENT NO. : 8,295,292 B2  
APPLICATION NO. : 12/783419  
DATED : October 23, 2012  
INVENTOR(S) : Tse et al.

Page 1 of 1

It is certified that error appears in the above-identified patent and that said Letters Patent is hereby corrected as shown below:

In Column 20, Line 18, in Claim 20, delete "Receiving," and insert -- receiving, --, therefor.

Signed and Sealed this
Fifth Day of February, 2013

Teresa Stanek Rea
*Acting Director of the United States Patent and Trademark Office*